United States Patent [19]

Stockwell

[11] 3,855,461

[45] Dec. 17, 1974

[54] CALCULATOR WITH KEY CODE ASSOCIATION AND DISPLAY FEATURES

[75] Inventor: Richard Kent Stockwell, Palo Alto, Calif.

[73] Assignee: Hewlett-Packard Company, Palo Alto, Calif.

[22] Filed: Aug. 30, 1973

[21] Appl. No.: 393,081

[52] U.S. Cl. .............................. 235/156, 340/172.5
[51] Int. Cl. .......................... G06f 7/38, G06f 15/02
[58] Field of Search .......... 235/156, 152; 340/172.5

[56] References Cited

UNITED STATES PATENTS 3,706,973 12/1972 Acquadro et al. .............. 235/156 X
3,760,171 9/1973 Wang et al. .......................... 235/156

OTHER PUBLICATIONS

Foster, "Battery Powered Data Entry Unit," IBM Tech. Disc. Bull., Vol. 15, No. 11, 1973, (April), pg. 3437–3438.

*Primary Examiner*—Charles E. Atkinson
*Attorney, Agent, or Firm*—F. David LaRiviere

[57] ABSTRACT

A programmable calculator is provided with an indexing scheme for directly associating displayed key codes with the physical position of non-numeric or the identity of digit keys contained on the keyboard. Individual keys are represented by a two-digit number wherein the most significant digit is the number of the row in which the key is located and the least significant digit is the number of the column which the key occupies along that row. For digit keys the first digit of the key code is zero and the second digit of the key code is the assigned value of the key. The calculator also includes provision for displaying the key code of the last key actuated.

12 Claims, 2 Drawing Figures

CALCULATOR WITH KEY CODE ASSOCIATION AND DISPLAY FEATURES

BACKGROUND AND SUMMARY OF THE INVENTION

This invention relates generally to calculators and more particularly to programmable electronic calculators in which keyboard operations become program instructions. In this particular type of calculator, no special language is required; when a key is pressed, one program step is completed.

Programmable electronic calculators generally utilize memories which enable them to store instructions and data for repetitive and iterative solutions. In order to enter a program into memory, the user depresses the calculator keys in a given sequence. The result of each sequence step may be displayed for the convenience of the user as he progresses through his calculation. The key code for each program step may also be displayed. Key codes generally are alpha-numeric representations of the keys on the keyboard. If the user wishes to modify or edit his program after initial entry into memory, he must precisely determine to which key he should return in order to implement the change. To make that determination for calculators constructed according to the prior art, the user had to refer to a separate, machine-unique association table for determining the specific key to depress relative to the particular key code displayed. Such tables are supplied by the calculator manufacturer as an accessory to his product and may take the form of an instruction card.

Instruction cards are inconvenient to use and easily misplaced. One object of the present invention, therefore, is to eliminate the need for a separate key code table by providing direct association of calculator keys with the displayed key code.

For programming convenience, key codes should be easily interpreted by the user. Hence, another object of this invention is to improve the ease of program debugging and editing by introducing an index scheme which relates key position on the keyboard or key identity to the displayed key code.

A still further object of this invention is to provide a calculator which has the capability of displaying the key code of the last key actuated even when it is in a non-programmable mode of operation.

DESCRIPTION OF THE PREFERRED EMBODIMENT

Figure 1:
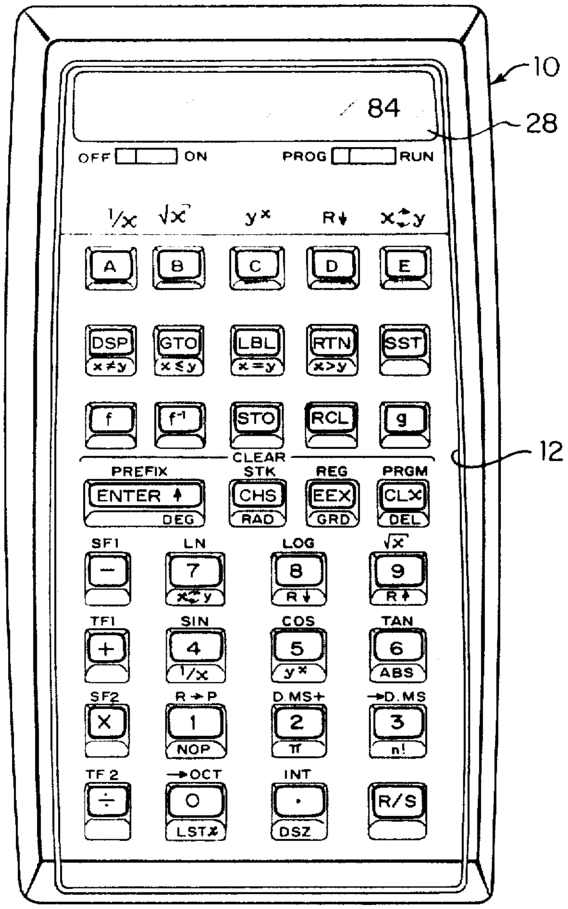
FIG. 1 is a front view of a calculator according to the preferred embodiment of the present invention.
Figure 2:
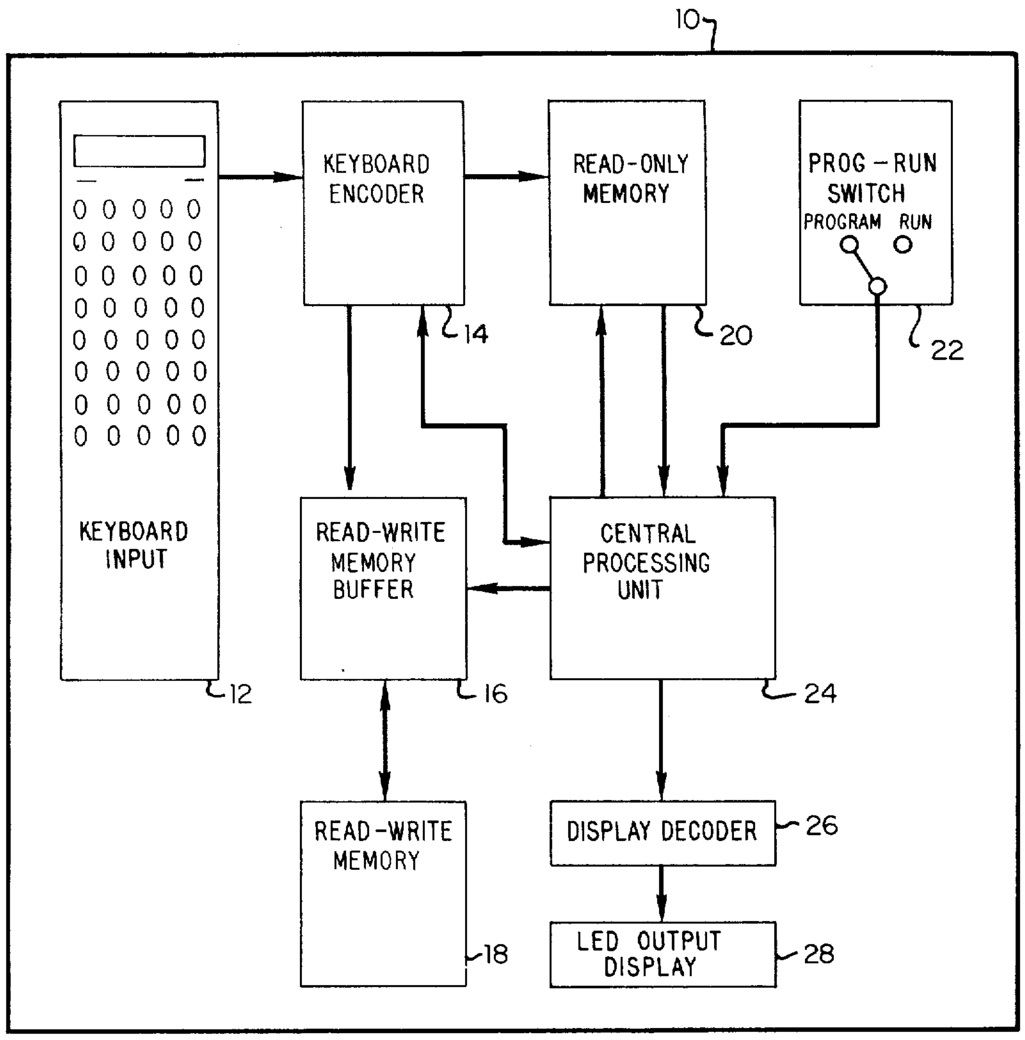
FIG. 2 is a block diagram of the calculator of FIG. 1.

Referring to FIGS. 1 and 2, a programmable electronic calculator 10 is shown which includes a keyboard input 12 for entering data and instructions into the calculator, and an LED output display unit 28 for displaying the key code for the keys depressed on keyboard 12. The programmable calculator of this invention also includes a keyboard encoder 14, a read-write memory buffer 16, read-write and read-only memories 18 and 20, respectively (RWM and ROM), a central processing unit (CPU) 24, and a display decoder 26.

The ROM 20, RWM 18 and RWM buffer 16 are comprised of two-phase dynamic MOS/LSI circuits similar to the type described in copending U.S. Patent application Ser. No. 302,371 entitled "IMPROVED BUSINESS CALCULATOR," filed Oct. 30, 1972, and assigned to the same assignee as the present application. The central processing unit 24 comprises the MOS control and timing circuit and the MOS arithmetic and register circuit separately described in the application referenced above. Similarly, the keyboard 12, display decoder 26 and LED display 28 are like those described in the same copending application mentioned above.

While not intended to be a limitation of the present invention, only key codes are displayed during entry of the user's program into the programmable calculator of the preferred embodiment of this invention. A symbolic representation of the particular key depressed could also be displayed in other additional segments of the display if desired. For entry of a program, a program-run switch 22 is moved to the "program" position. Any type of break-before-make switch may be used for this switch. Keyboard encoder 14 scans the matrix of switches housed by keyboard 12 in search of an interconnection which designates actuation of a key. When it detects a switch interconnection, keyboard encoder 14 initializes CPU 24. Any convenient switch design may be used for keys. Each key has a uniquely associated six-bit code which is generated by keyboard encoder 14 in response to key actuation. The six-bit code is generated and stored as discussed below, irrespective of the position to which program-run switch 22 is set.

Key codes from encoder 14 are loaded into RWM buffer 16 and ROM 20. In ROM 20, key codes establish the address in ROM 20 to which CPU 24 refers for instruction. Since each key has a uniquely associated key code, there is a unique address in ROM 20 associated with each key on the keyboard. CPU 24, under control of ROM 20, directs RWM buffer 16 to insert the key code it contains into RWM 18. Insertion of key codes from RWM buffer 16 to RWM 18 is non-destructive and therefore key codes remain available in RWM buffer 16 for use by CPU 24 after insertion. This feature of this implementation of the invention is important since it allows the key code for the last actuated key to be displayed even if the calculator is in "run" mode, which is determined by the setting of program-run switch 22. The details of key code display for "run" mode entries are discussed later in this specification.

As mentioned above, ROM 20 contains microinstructions at unique addresses for each keyboard key. Since the key code contained in RWM buffer 16 is also the address of a corresponding key code display instruction resident in ROM 20, CPU 24 can determine the proper address to which it must refer in ROM 20 for display instruction by interrogating RWM buffer 16. CPU 24 then executes the instruction it finds at that address of ROM 20 to display the key code, and transmits the result to display decoder 26. Display decoder 26 then decodes the output of CPU 24 and presents the decoded key code information for display by LED output display 28.

The key codes displayed for non-numeric keys are representations of the physical location of those keys on the keyboard. While in the preferred embodiment of this invention the key codes for digit keys are representations of the assigned value of the keys, the indexing scheme for non-numeric keys could be applicable to digit keys as well. In any case, the key codes are organized into an indexing scheme for directly associating keyboard keys with the displayed codes without the use of an instruction card.

As shown in FIG. 1, there are 35 keys arranged in a matrix of 8 rows and 5 columns. Of course, display of key codes for any number of keys arranged in any number of rows and columns is anticipated by this invention. The key codes for all keys, except the single step (SST) key, are represented by a two digit number. For all except digit keys, the first digit is the number of the row containing the key, beginning with row one immediately beneath the display. The second digit is the number of the column which the key occupies along that row from left to right. For each digit key the first digit of the key code is zero and the second digit is its value (e.g. the key code for digit key 5 is displayed as 05). Therefore, utilizing the concept of this invention, the key labeled "R/S" is identified by key code 84, since it is located in the eighth row and fourth column of that row. Even though the SST key occupies key code position 25, no key code is required for this key for reasons given below.

The key codes of previously entered program instructions are recalled by using the SST key with program-run switch 22 set to the "program" position. Referring to FIG. 2, the function of this key is accomplished by RWM buffer 16 retrieving the stored key code from RWM 18 at the direction of CPU 24. CPU 24 is initialized by keyboard encoder 14 which detects the SST key actuation on keyboard 12. When the user wishes to modify or edit a program which is already entered, he needs only to repetitively depress the SST key and observe the display. The key code displayed each time the SST key is depressed will be that of the keys actuated during program entry in the same order as entered. Many keys in the preferred embodiment are multifunctional, i.e., prefix keys determine the alternate function actuated when a function key is depressed; a prefix key labeled "*g*" is associated with the lower legend on an angled face of each function key; a prefix key labeled "*f*" is associated with the legend on the keyboard appearing above each function key; and a prefix key labeled "$f^{-1}$" is associated with the inverse of the same legends as the "*f*" prefix key. However, by following along the program formula he originally entered as indexed by the key code matrix scheme, the user can identify the precise step at which he wishes to make a change and do so without the inconvenience of constant referral to an instruction card. Since the SST key is the means for recalling previously entered key codes in the preferred embodiment of this invention, a key code for the SST key itself is not required.

An example of the edit feature follows:

If the user wanted to enter a simple program represented by the mathematical relationship $$1 + \sin^2 x,$$

the displayed key codes of the keys he would actuate in the preferred embodiment of this invention are given below:

| Key Depressed | Key Code Displayed |
|---|---|
| f | 31 |
| sin | 04 |
| $f^{-1}$ | 32 |

-Continued

| Key Depressed | Key Code Displayed |
|---|---|
| $\sqrt{x}$ | 09 |
| 1 | 01 |
| + | 61 |
| R/S | 84 |

If the user then wished to change the program to $4 + \sin^2 x$, he would repetitively depress the SST key until key code "01" was displayed. The user would then know that this entry should be deleted and replaced with the value 4. To accomplish such deletion in this embodiment, (referring to FIG. 1) the user would then depress the "*g*" prefix key to initialize the delete function of the calculator, and key code "35" would appear in LED output display 28. Next, the user would depress the "DEL" key to delete key code "01" which represents the value "1" previously entered. Key code "35" is also deleted at this time so that key code "09" appears in LED output display 28 to remind the user that RWM 18 has retained all of the program up to the "$\sqrt{x}$" step. Furthermore, by observing the "09" key code and referring to his program equation, the user knows that the calculator is now ready to receive the new value "4." Of course, the key code for this digit key is "04." A summary of this change procedure for the preferred embodiment of this invention described above is given below.

| Key Depressed | Key Code Displayed |
|---|---|
| SST | 01 |
| g | 35 |
| DEL | 09 |
| 4 | 04 |

Referring again to FIGS. 1 and 2, when program-run switch 22 is set to the "run" position, the calculator is in "run" mode. Six-bit key codes of the keys depressed to perform a calculation are encoded by keyboard encoder 14 and are loaded into RWM buffer 16 in the same manner described above for the "program" mode. Since the calculator is not in the "program" mode, the contents of RWM buffer 16 are not inserted into RWM 18. However, the contents are available to generate a "program" mode display of the key code upon setting program-run switch 22 to the "program" position. User convenience is greatly enhanced by this feature of the invention because he can determine his last keyboard entry even when he is not in the act of programming the calculator. Merely by moving program-run switch 22 from the "run" position to the "program" position, observing the key code displayed, and, after determining at what place in the calculation he stopped for whatever reason, the user simply resets program-run switch 22 to the "run" position to continue the calculation. As the calculation is continued, each key code loaded into RWM buffer 16 is replaced by the key code of the next key depressed.

I claim:

1. An electronic calculator comprising:

an input unit, including control elements and including a plurality of keys having unique key codes, for controlling the calculator and entering information into the calculator, respectively;

an encoder unit coupled to the input unit for encoding information received therefrom;
a first memory unit coupled to the encoder unit for storing encoded information received therefrom;
a second memory unit, coupled to the encoder unit, for storing microinstructions;
a computing unit, coupled to the encoder unit and the first and second memory units, responsive to encoded information from the encoder unit or the first memory unit for selectively performing one or more operations employing microinstructions stored in the second memory unit; and
output display means, coupled to the computing unit, for displaying the results of operations performed by the calculator and for displaying key codes;
said computing unit being responsive to actuation of a control element for causing the key code of the last key actuated to be displayed by the output display means.

2. A calculator as in claim 1 wherein the computing unit is responsive to actuation of a control element for causing the calculator to be programmable in a program mode or to perform calculations directly in a run mode.

3. A calculator as in claim 2 wherein:
the last-mentioned control element is a switch having a run position and a program position; and
the computing unit is responsive to actuation of the switch for causing the key code of the last key actuated in the run mode to be displayed when the switch is set in the program position.

4. A programmable electronic calculator comprising:
an input unit, including a keyboard and a plurality of keys having unique key codes representing the physical location of the keys on the keyboard, for entering information into the calculator;
an encoder unit coupled to the input unit for encoding information received therefrom;
a first memory unit coupled to the encoder unit for storing information received therefrom;
a second memory unit, coupled to the encoder unit, for storing microinstructions;
a computing unit, coupled to the encoder unit and the first and second memory units, responsive to encoded information from the encoder unit or the first memory unit for selectively performing one or more operations employing microinstructions stored in the second memory unit; and
output display means, coupled to the computing unit, for displaying the results of operations performed by the calculator and for displaying key codes;
said computing unit being responsive to encoded information representing the key code of an actuated key of the input unit received from the first memory unit for causing the key code to be displayed by the output display means.

5. A calculator as in claim 4 wherein:
the plurality of keys include non-numeric and digit keys arranged in a matrix of rows and columns; and
the displayed key code is a number in which the most significant digits comprise the number of the row in which the key is located and the least significant digits comprise the number of the column which the key occupies along the row.

6. A calculator as in claim 5 wherein:
the plurality of keys are arranged in a matrix of less then 10 rows and less than 10 columns; and
the number is a two-digit number having a most significant digit which is an integer less than nine corresponding to the row number in which the key is located and a least significant digit which is an integer less than nine corresponding to the column the key occupies along the row.

7. A calculator as in claim 6 wherein:
the plurality of keys are arranged in a matrix of 8 rows and 5 columns; and
the number is a two-digit number having a most significant digit which is an integer from one through eight corresponding to the row number in which the key is located and having a least significant digit which is an integer from one through five corresponding to the column the key occupies along that row.

8. A calculator as in claim 5 wherein the displayed key code for each digit key is a number in which the most significant digits are zero and the least significant digits are the assigned value of that digit key.

9. A calculator as in claim 8 wherein the number is a two-digit number in which the most significant digit is zero and the least significant digit is an integer from one through nine corresponding to the value of the digit key.

10. A calculator as in claim 5 wherein:
the displayed key code for each non-numeric key is a two-digit number having a most significant digit which is an integer less than nine corresponding to the row number in which the key is located and a least significant digit which is an integer less than nine corresponding to the column the key occupies along the row; and
the displayed key code for each digit key is a two-digit number in which the most significant digit is zero and the least significant digit is an integer from one through nine corresponding to the value of that digit key.

11. An electronic calculator comprising:
input means, including control elements and including a plurality of keys having unique key codes, for controlling the calculator and entering information into the calculator, respectively;
storage means coupled to the input means for storing encoded information received therefrom, and for storing micro-instructions;
computing means, coupled to the input means and the storage means, responsive to encoded information from the input means or the storage means for selectively performing one or more operations employing microinstructions stored in the storage means; and
output display means, coupled to the computing means, for displaying the results of operations performed by the calculator and for displaying key codes;
said computing means being responsive to actuation of a control element for causing the key code of the last key actuated to be displayed by the output display means.

12. An electronic calculator comprising:
an input means, including a keyboard and a plurality of keys having unique key codes representing the physical location of the keys on the keyboard, for entering information into the calculator;

storage means coupled to the input means for storing information received therefrom, and for storing microinstructions;

computing means, coupled to the input means and the storage means, responsive to encoded information from the input means or the storage means for selectively performing one or more operations employing microinstructions stored in the storage means; and output display means coupled to the computing means for displaying the results of operations performed by the calculator and for displaying key codes;

said computing means being responsive to encoded information representing the key code of an actuated key of the input means received from the storage means for causing the key code to be displayed by the output display means.

* * * * *